(12) United States Patent
Maelfeyt et al.

(10) Patent No.: US 10,986,784 B2
(45) Date of Patent: Apr. 27, 2021

(54) KNOTTER SYSTEM FOR A BALER

(71) Applicant: CNH Industrial America LLC, New Holland, PA (US)

(72) Inventors: Kenny Maelfeyt, Vlissegem (BE); Bram Willem, Houthulst (BE)

(73) Assignee: CNH Industrial America LLC, New Holland, PA (US)

( * ) Notice: Subject to any disclaimer, the term of this patent is extended or adjusted under 35 U.S.C. 154(b) by 70 days.

(21) Appl. No.: 16/402,446

(22) Filed: May 3, 2019

(65) Prior Publication Data
US 2019/0335671 A1 Nov. 7, 2019

(30) Foreign Application Priority Data

May 3, 2018 (BE) .................................. 2018/5286

(51) Int. Cl.
*A01F 15/14* (2006.01)
*A01F 15/12* (2006.01)

(52) U.S. Cl.
CPC ............ *A01F 15/145* (2013.01); *A01F 15/12* (2013.01)

(58) Field of Classification Search
CPC ................................ A01F 15/12; A01F 15/145
See application file for complete search history.

(56) References Cited

U.S. PATENT DOCUMENTS

| | | | |
|---|---|---|---|
| 796,926 A | 8/1905 | McElroy | |
| 2,723,871 A | 11/1955 | Rudeen | |
| 3,101,963 A | 8/1963 | Sullivan et al. | |
| 3,400,959 A * | 9/1968 | Grillot | A01F 15/145 289/2 |
| 3,468,575 A | 9/1969 | Grillot | |
| 4,022,501 A | 5/1977 | White | |
| 4,074,623 A * | 2/1978 | White | A01F 15/145 100/19 R |
| 4,108,062 A * | 8/1978 | White | A01F 15/145 100/11 |
| 4,142,746 A * | 3/1979 | White | A01F 15/145 100/19 R |
| 4,161,097 A | 7/1979 | Vansteelant | |
| 4,196,661 A * | 4/1980 | Yatcilla | A01F 15/148 100/4 |

(Continued)

FOREIGN PATENT DOCUMENTS

| | | |
|---|---|---|
| DE | 102005012328 B4 | 8/2012 |
| WO | 2015/014616 A1 | 2/2015 |

*Primary Examiner* — Shaun R Hurley
(74) *Attorney, Agent, or Firm* — Peter Zacharias; Patrick Sheldrake

(57) ABSTRACT

A knotter system for a baler includes a needle and a tucker arm for delivering a needle twine and tucker twine respectively, a twine receiver for holding the needle and the tucker twine, a billhook assembly including a billhook with a lower and an upper lip being mounted rotatably around an axis and being arranged for receiving the needle and the tucker twine, a twine finger for guiding the twine. Further, a driver is foreseen to make the billhook perform a first full rotation during the first knot forming cycle and a second full rotation during the second knot forming cycle. The knotter system is configured such that, at the end of the second knot forming cycle, a bale movement of a bale in the baler exerts a pulling force on the twines which removes the twines from the billhook.

14 Claims, 14 Drawing Sheets

(56) References Cited

U.S. PATENT DOCUMENTS

| | | | |
|---|---|---|---|
| 4,234,219 A | | 11/1980 | Vansteelant |
| 4,765,235 A | * | 8/1988 | Schrag ................. A01F 15/148 100/3 |
| 7,296,828 B2 | * | 11/2007 | Schoonheere ........ A01F 15/145 289/2 |
| 2006/0012176 A1 | | 1/2006 | Schoonheere et al. |
| 2009/0250930 A1 | * | 10/2009 | Eylenbosch .......... A01F 15/145 289/2 |
| 2012/0211979 A1 | | 8/2012 | Schumacher et al. |
| 2015/0272011 A1 | | 10/2015 | Demon |
| 2016/0212943 A1 | | 7/2016 | Verhaeghe et al. |
| 2018/0125012 A1 | * | 5/2018 | Naeyaert ............... A01F 15/145 |

\* cited by examiner

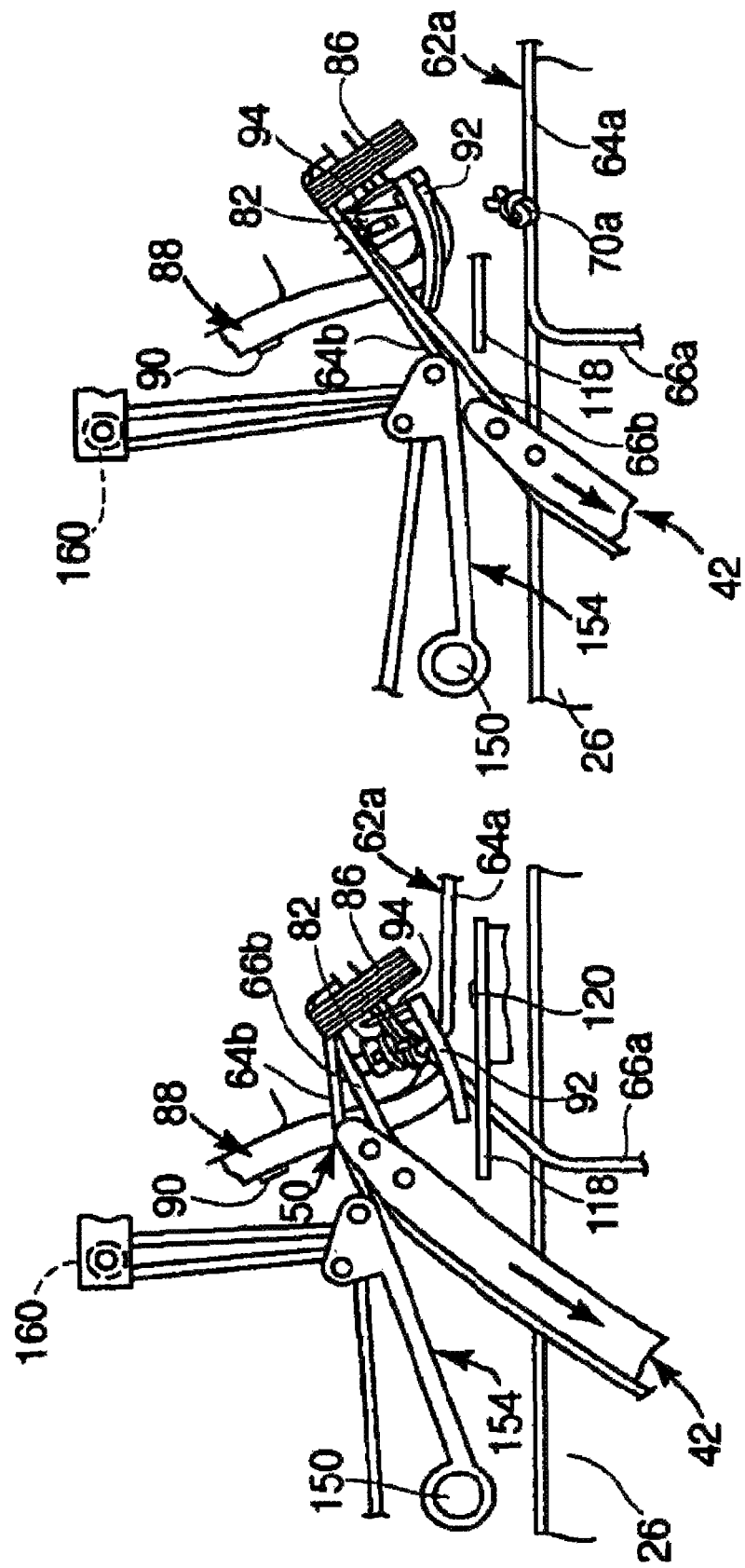

KNOTTER SYSTEM FOR A BALER

FIELD OF THE INVENTION

The present invention relates to a knotter system, and in particular to a knotter system for a baler for forming two consecutive knots during a single knotter cycle.

BACKGROUND OF THE INVENTION

Rectangular bales are able to maintain their shape by means of a series of parallel extending twine loops, provided lengthwise around the bales. Balers may use automatic knotters to create two knots on every twine loop for binding a bale. An example of such a knotter system for a baler is disclosed in US 2006/0012176 in the name of the Applicant, the disclosure of which is included herein by reference. The knotter system disclosed in US 2006/0012176 has the advantage that two consecutive knots can be formed during one operation cycle, without the formation of twine tails. Similar improved knotter systems are disclosed in patent applications in the name of the Applicant with publications numbers WO2015/014616 and WO2014/060245, the disclosure of which is included herein by reference.

By forming the second knot without the formation of twine tails, more twine is incorporated in the second knot and a loopknot is created on the billhook. It has been noticed that a second knot formed in this manner cannot be easily removed from the billhook.

SUMMARY OF THE INVENTION

The object of embodiments of the present invention is to further improve the knotter system of US 2006/0012176 and WO2014/060245, and more in particular to improve removing the formed second knot from the billhook.

According to a first aspect of the invention, there is provided a knotter system for a baler for performing a knotter cycle comprising a first knot forming cycle and a second knot forming cycle. The knotter system comprises a needle, a tucker arm, a twine receiver, a billhook assembly, a cutting arm, a twine finger and a drive means. The needle is configured for delivering a needle twine. The tucker arm is configured for delivering a tucker twine. The twine receiver is configured for holding the needle twine and the tucker twine. The billhook assembly comprises a billhook with a lower lip and an upper lip mounted pivotally with respect to the lower lip along a pivotal axis. The billhook is mounted rotatably around a rotation axis and is arranged for receiving the needle twine and the tucker twine. The cutting arm is adapted for cutting twines. The twine finger is configured for guiding at least the needle twine. The drive means is adapted to make the billhook perform at least a first full rotation around the rotation axis during the first knot forming cycle and a second full rotation around the rotation axis during the second knot forming cycle, to move the cutting arm a first time from a rest position to an extended position and back during the first knot forming cycle and a second time during the second knot forming cycle, and to move the twine finger at least a first time during the first knot forming cycle and a second time during the second knot forming cycle. The billhook, cutting arm, and twine finger are configured such that, at the end of the second knot forming cycle, a bale movement of a bale which is being formed by the baler exerts a pulling force on the twines which removes the twines from the billhook. Desirably, this is achieved by giving the billhook and the cutting arm a suitable shape and by suitably positioning the twine finger at the end of the second knot forming cycle.

Prior art knotter systems may cause the billhook to complete a third rotation in order to open the billhook such that the created second knot can be removed therefrom. Such a third rotation has no function in forming the first or second knot but is merely used to cause the lower lip and the upper lip of the billhook to open up to release the formed second knot therefrom. Such additional third rotation adds to the complexity of the knotter system, takes additional time to complete and adds to the wear and tear of the involved elements such as the billhook assembly, billhook cam and cam follower, etc.

By configuring the billhook, cutting arm, and twine finger in such a way that, at the end of the second knot forming cycle, the movement of the bale which is currently being formed by the baler exerts a pulling force on the twines which removes the twines from the billhook, the formed second knot is removed from the billhook passively without requiring a third rotation of the billhook. In this manner, the formed second knot is removed from the billhook without adding to the complexity of the knotter system and without risking additional wear and tear of elements of the knotter system. The invention is based amongst others on the inventive insight that the movement of a bale which is being formed may be used to exert a pulling force on the twines to remove the formed second knot from the billhook by accordingly configuring and arranging the billhook, cutting arm and twine finger.

In an exemplary embodiment the billhook, cutting arm, and twine finger are configured such that the twines are positioned in such a way that the pulling force causes the billhook to open. Desirably, this is achieved by giving the billhook and the cutting arm a suitable shape and by suitably positioning the twine finger at the end of the second knot forming cycle.

In an exemplary embodiment the billhook is configured such that the pulling force on the twines causes the upper lip of the billhook to pivot away from the lower lip of the billhook. Desirably, this is achieved by giving the billhook a suitable shape.

In an exemplary embodiment the upper lip of the billhook is formed such that the upper lip and lower lip define an opening angle in the direction of the pulling force. Desirably, this is achieved by giving the upper lip of the billhook a suitable shape.

In an exemplary embodiment the upper lip is mounted pivotally with respect to the lower lip along a pivotal axis which is inclined with respect to the lower lip.

In an exemplary embodiment the cutting arm is configured for sweeping a formed knot from the billhook during the first knot forming cycle and only partly during the second knot forming cycle, respectively. During the second knot forming cycle the movement of the cutting arm further forms the knot on the billhook, during which the knot is pulled tight. By pulling tight the knot in this manner, the formed knot remains substantially entirely on the billhook such that at most only a part of the formed knot is swept of the billhook by the cutting arm movement.

In an exemplary embodiment the cutting arm comprises twine supporting means which are configured to, at least at the end of the second knot forming cycle, support the needle twine and tucker twine leading up to the formed knot in such a position that the pulling force removes the formed second knot from the billhook.

In an exemplary embodiment the twine supporting means comprise an elongated protrusion extending from the cutting arm.

In an exemplary embodiment the drive means are configured to move the twine finger, during the second knot forming cycle, from a rest position to a fully extended position, then to a less extended position whilst rotating the billhook, and back to the rest position. The twine finger may be moved back to the rest position actually at the end of the cutting arm movement. Alternatively the twine finger moves back to the rest position before moving the cutting arm. In a further exemplary embodiment the drive means are configured to move the twine finger to the fully extended position before moving the twine finger back to the rest position.

In an exemplary embodiment the drive means comprise an operating link, a crank and a transversely extending shaft, said operating link being attached at one end to the twine finger and at the opposite end to the crank for driving a swinging movement of the twine finger, said crank being fixed to said transversely extending shaft configured to be rotated such that the twine finger performs the swinging movement.

In an exemplary embodiment the transversely extending shaft carries a second crank which carries a cam follower at its outermost end, said cam follower being in position for operating engagement with a cam fixed to a driving shaft for rotation therewith, said cam having at least a first and second lobe and for swinging the twine finger during the first and the second knot forming cycle, respectively.

According to an exemplary embodiment the second lobe is formed with two peaks and a valley between the two peaks for causing the twine finger, during the second knot forming cycle, to swing from a rest position to a fully extended first position, then to a less extended second position, next to a fully extended third position, and back to the rest position. The twine finger may be moved back to the rest position actually at the end of the cutting arm movement. Alternatively the twine finger moves back to the rest position before moving the cutting arm.

According to an exemplary embodiment the drive means comprise a pinion and at least a first and second gear stretch provided along the circumference of a disc, said pinion being adapted to cooperate with said first and second gear stretch for making the billhook perform a first and second full rotation respectively when said disc is rotated for forming the first and the second knot, respectively.

According to an embodiment the drive means comprise a cam track and a cam follower, said cam follower being connected with the cutting arm, and said cam track being provided in said disc or in a member mounted for rotating synchronously with said disc, and being adapted for moving the cutting arm a first time and a second time during the first and the second knot forming cycle, respectively.

According to a second aspect of the invention there is provided a baler comprising a plurality of knotter systems according to any one of the preceding exemplary embodiments.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein:

FIGS. 5-13 are fragmentary, schematic views illustrating successive steps of a double-knotting operation;

DESCRIPTION OF THE DRAWINGS

In the description which follows and in certain passages already set forth, the principles of the present invention will be described in terms of "twine" and "knots" formed in such twine. However, it is to be recognized that such principles extend to wire and twisted junctions of wire as well as twine and knots.

Many of the fastening, connection, processes and other means and components utilized in this invention are widely known and used in the field of the invention described, and their exact nature or type is not necessary for an understanding and use of the invention by a person skilled in the art, and therefore they will not be discussed in significant detail. Also, any reference herein to the terms "left" or "right" are used as a matter of mere convenience, and are determined by standing at the rear of the machine facing in its normal direction of travel.

Figure 1:
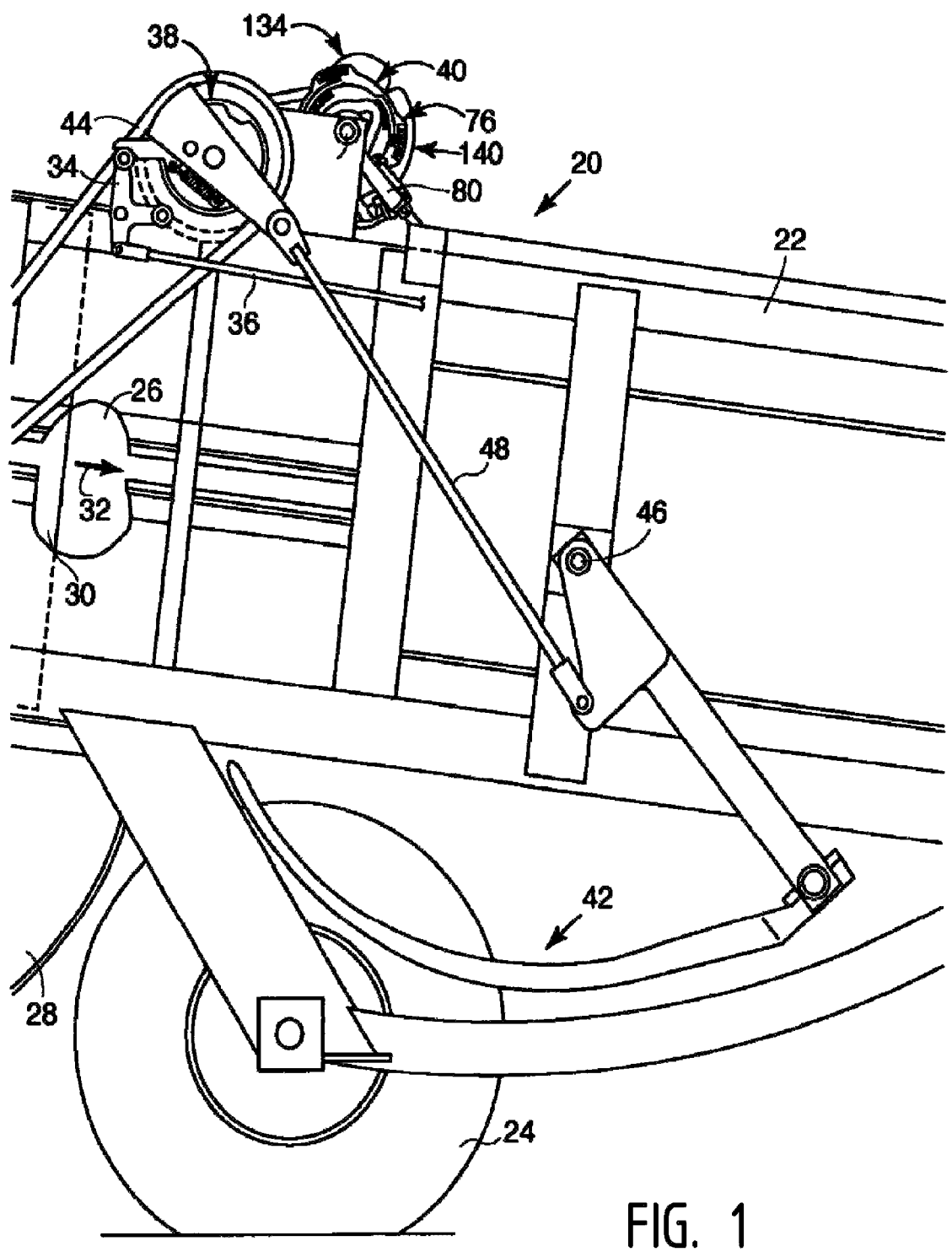
FIG. 1 is a fragmentary, side elevational view of a baler having a double knotter tying mechanism according to the prior art.

The baler 20 illustrated in FIG. 1 has a rectangular bale case 22 that is supported by ground wheels 24. The bale case 22 defines a bale chamber 26 wherein material is pushed in through a curved duct 28. A plunger 30 reciprocates within the bale case 22 to intermittently pack fresh charges of material from the duct 28 rearward in the chamber 26 in the direction of the arrow 32. When the bale reaches a predetermined size, a trigger 34 is pulled by a rod 36. This rod 36 engages a dog clutch 38, the clutch 38 in turn being connected to a tying mechanism 40 and a set of needles 42. As will be appreciated, the tying mechanism comprises a set of individual knotters 40 provided crosswise on top of the bale chamber 26 at intervals. Each knotter 40 has an associated needle 42 for assisting in forming an individual loop around a finished bale. When the bale needs tying, the dog clutch 38 connects the knotter 40 and its needles 42 via a drive chain 44 to a source of driving power to initiate the tying operation. As the individual knotters 40 all operate in an identical manner, it suffices to describe the present invention in relation to only one such knotter 40.

Figure 4:
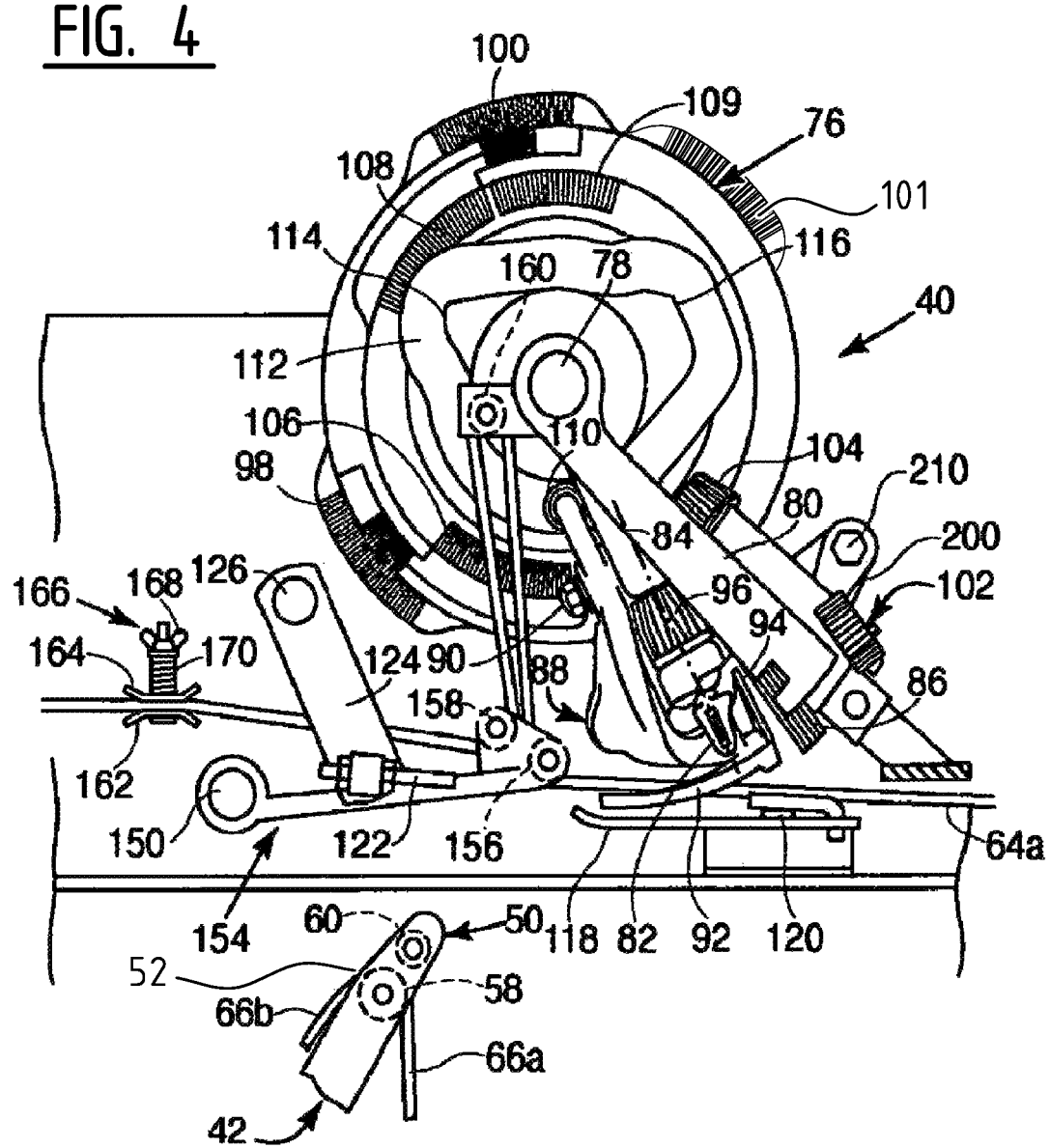
FIG. 4 is an enlarged, fragmentary, side elevational view of an exemplary embodiment of a knotter system in mid cycle.

The needle 42 is swingably mounted on the bale case 22 by a pivot 46 and is swung back and forth across the bale chamber 26 by a linkage 48, which is activated by the clutch 38. The needle 42 has an "at-home" or rest position fully below the bale case 22 as illustrated in FIG. 1 and a "full-throw" position extending completely across the bale case as illustrated, for example in FIG. 9. As illustrated in FIG. 4, the tip 50 of needle 42 has an eyelet 52 in conjunction with a pair of longitudinally spaced, transversely extending rollers 58 and 60. In the illustrated embodiment the roller 58 is positioned inwardly from the outer extremity of the tip 50, while the roller 60 is positioned outwardly from the roller 58 more closely adjacent this extremity. The roller 60 is positioned a short distance inwardly from the outer extremity of the tip 50, and both of the rollers 58 and 60 may be tapered toward their mid points, comparable to a diabolo, so as to provide secure seats for the twine.

Figure 2:
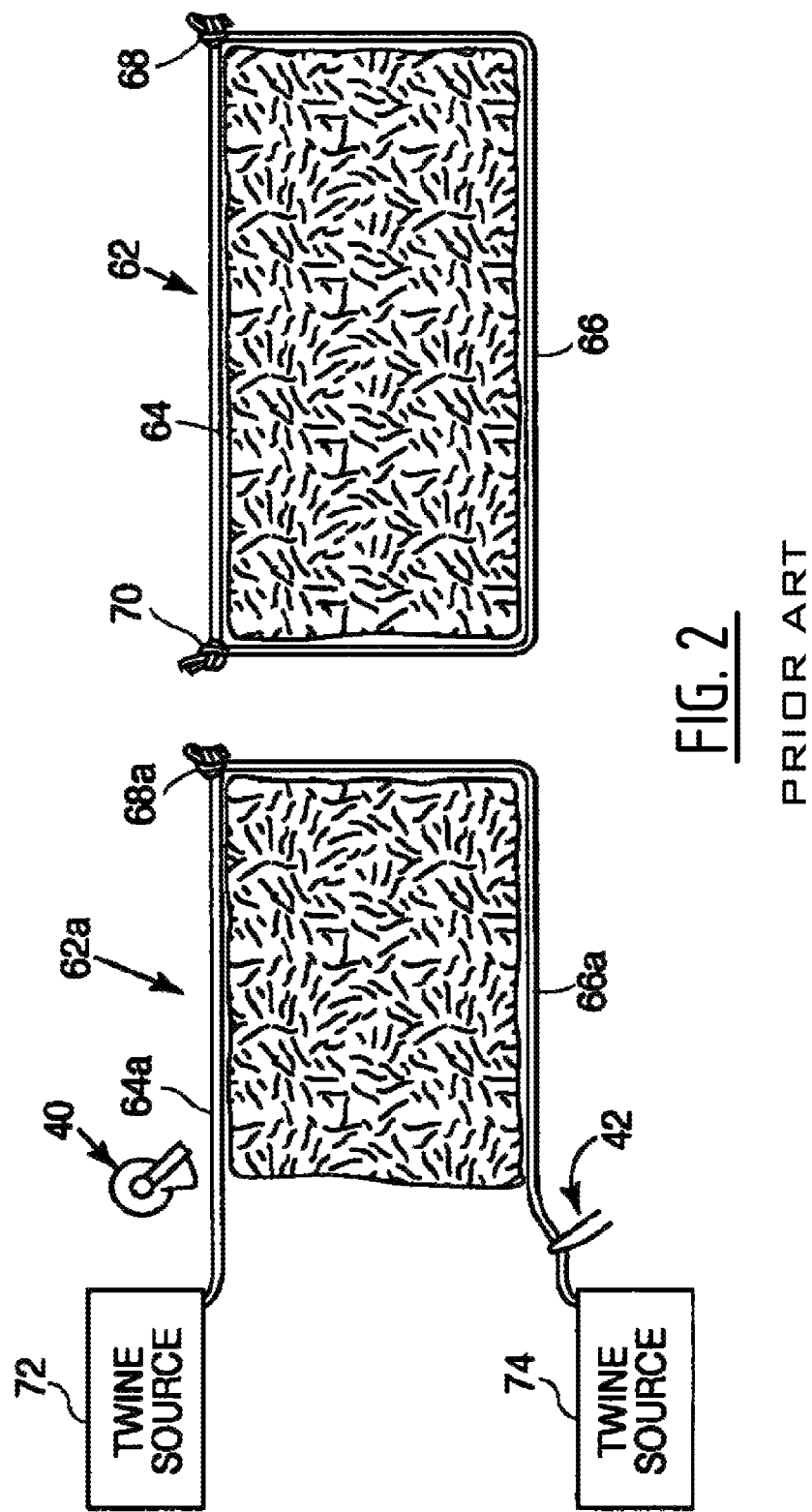
FIG. 2 is a diagrammatic view of a complete and a partial double-knotted loop without the forming of twine tails, according to the prior art.

With reference to FIG. 2, to the left of loop 62 is a partial loop 62*a* which is in the process of being formed. The already completed bale on the right is wrapped by a loop 62 formed by a top and bottom twine 64, 66 which are knotted in the two top corners of the bale, see knots 68 and 70. The partial loop 62*a* around the bale that is being formed comprises a top twine 64*a* (also called tucker twine) and a bottom twine 66*a* (also called needle twine). The top twine 64*a* emanates from a source of twine supply 72, while the bottom twine 66*a* emanates from an entirely separate, second source of twine supply 74. At the particular point in the sequence chosen for illustration, a knot 68*a* (this is the second knot of an already executed knotter cycle where knot 70 was formed as the first knot and knot 68*a* as the second knot) is in existence, and the bale is approaching that length where the needle 42 is ready to swing into operation and present the twines 64*a* and 66*a* to the knotter 40 to start a knotter cycle in which two consecutive knots are being formed. In a finished bale, the loop 62 is made from two strands of binding material, i.e., one strand of twine 64 along the top side of the bale and a second strand of twine 66 along the bottom side of the bale and its two opposite, vertical ends. The strands of twine 64 and 66 together form the continuous loop 62. Together, they fully circumscribe the bale. The knot 70 (this is the first knot of a knotter cycle) is typically a traditional knot. It is however clear to the skilled person that the knot 70 may alternatively be a so called loopknot or any other appropriate knot. The knot 68, 68*a* of a bale (this is the second knot of a knotter cycle) may be a traditional knot or a loopknot. Embodiments of the present invention are particularly beneficial for knotter systems which perform knotter cycles wherein the second knot is a loopknot. In a loopknot the ends of the twines 64, 64*a* and 66, 66*a* of the knot 68, 68*a* are released from a retained position so they can be pulled back as will be described further to form a small loop on top of the knot. During formation of the second knot, the loop causes the second knot to wrap around the billhook as will be described further. The knot 68, 68*a* itself holds the ends of the twines 64, 64*a* and 66, 66*a* united with the knot 68, 68*a*.

Figure 3:
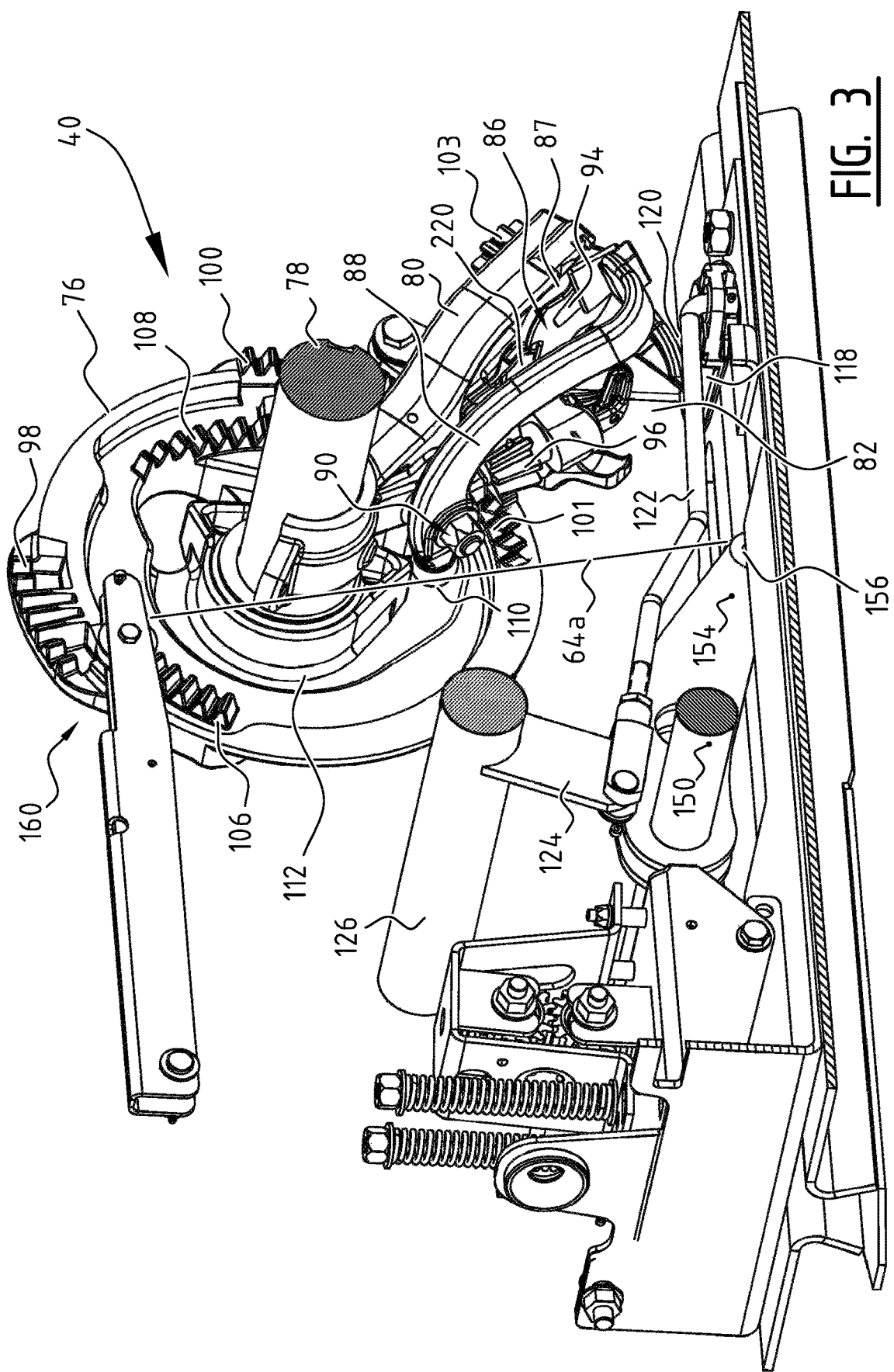
FIG. 3 is an assembled perspective view of an exemplary embodiment of a double knotter system.

FIG. 3 illustrates a first view of a knotter system, and FIG. 4 illustrates a second view. For convenience the same reference numerals have been used for referring to similar elements in the different views. The knotter 40 is similar in many respects to the knotters disclosed in US2006/0012176, WO2015/014616 and WO2014/060245 in the name of the Applicant, and the disclosure of those documents is herein incorporated by reference.

The knotter 40 of FIGS. 3 and 4 comprises a generally circular element, also called knotter disc 76 that is secured to a drive shaft 78 for rotation with the latter through one full revolution when the clutch 38 is engaged. The shaft 78 is supported by a forwardly inclined frame 80 attached to the top of the bale case 22, and the frame 80 also supports the knotter components for forming the knots in response to rotation of the knotter disc 76. Briefly, such knotter components include a rotary billhook member 82, supported by the frame 80 for rotation about an inclined axis 84; a twine disc, also called a twine receiver, 86 rearwardly of and adjacent to the billhook 82 for holding strand 64*a* of tucker twine and strand 66*a* of needle twine in position for engagement by the billhook 82 during rotation of the latter; and a cutting arm 88 with a knife 94 and with removal means 92 for sweeping the connected strands from the billhook 82. The cutting arm 88 is pivotally attached to the frame 80 by a bolt 90. The strands 64*a* and 66*a* are held in notches 87 (see FIG. 3) in the rotating twine disc 86 by a retainer or twine holder 220 (see FIG. 3). The tensioning force of this retainer 220 to the twine disc 86 can be adjusted manually by changing the tension of a leaf-spring 200 when a bolt 210 is loosened or tightened.

The lower end of the cutting arm 88 is shaped in such a way that it opens away from the twine disc 86 beneath the billhook 82. The cutting arm 88 further carries the knife 94 between the billhook 82 and the twine disc 86 for severing the strands 64*a* and 66*a* in response to a swinging movement of the cutting arm 88 in the proper direction. The knife 94 of the cutting arm 88 will only succeed in actually cutting the strands 64*a* and 66*a* when the strands are properly tensioned by the retainer or twine holder 220. As will be further discussed, during the second knot forming cycle, the strands are released from tension before the knife 94 comes into contact with the strands, which results in the strands not being cut during/after formation of the second knot. Such movement of the cutting arm 88 to operate the knife 94 also serves to bring the removal means 92 in engagement with a first knot formed on the billhook 82 for stripping such knot off of the billhook 82. The removal means 92 desirably have a shape which is substantially complementary to the shape of the billhook 82 to improve this sweeping of the billhook.

In order to transmit driving power to the billhook 82, the knotter disc 76 is provided with a bevel gear 96 which is disposed for meshing engagement with a pair of circumferentially spaced gear stretches 98, 100 and 101 on the knotter disc 76. Similarly, driving power is transmitted to the discs of the twine disc 86 through, a twine disc pinion 103, a worm gear drive 102 and a bevel gear 104 in position for sequential meshing engagement with a pair of circumferentially spaced gear sections 106, and 108 on the knotter disc 76. Power to swing the cutting arm 88 about the pivot bolt 90 is obtained through a cam follower 110 at the upper end of the cutting arm 88 beyond the pivot bolt 90 which is disposed within a cam track 112 on the knotter disc 76. A pair of circumferentially spaced cam shoulders 114 and 116 in the track 112 are positioned to sequentially engage the follower 110 to operate the latter.

Figure 8:
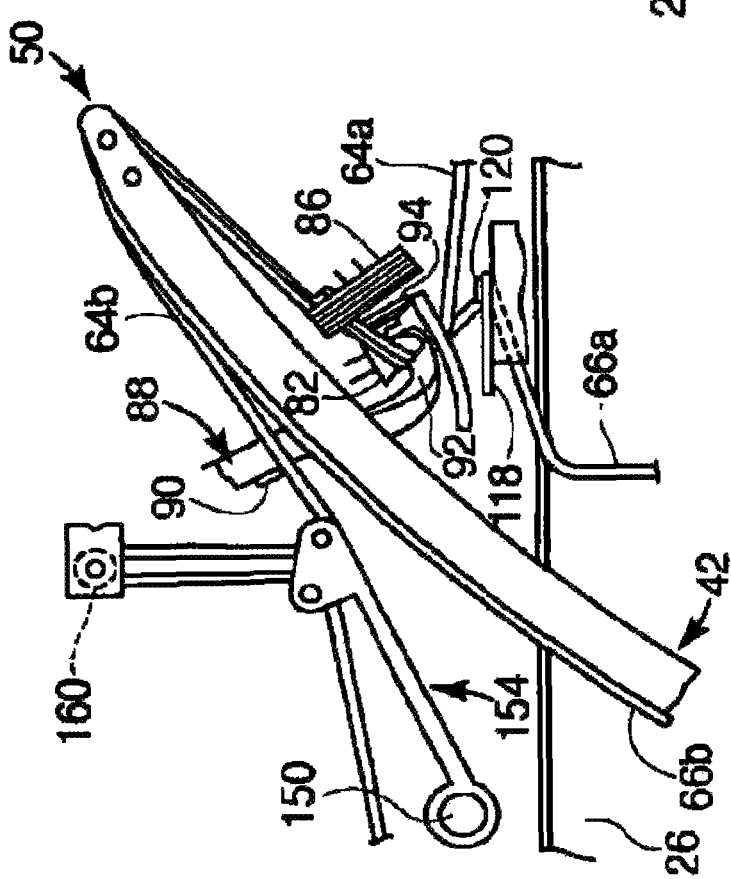
Figure 14:
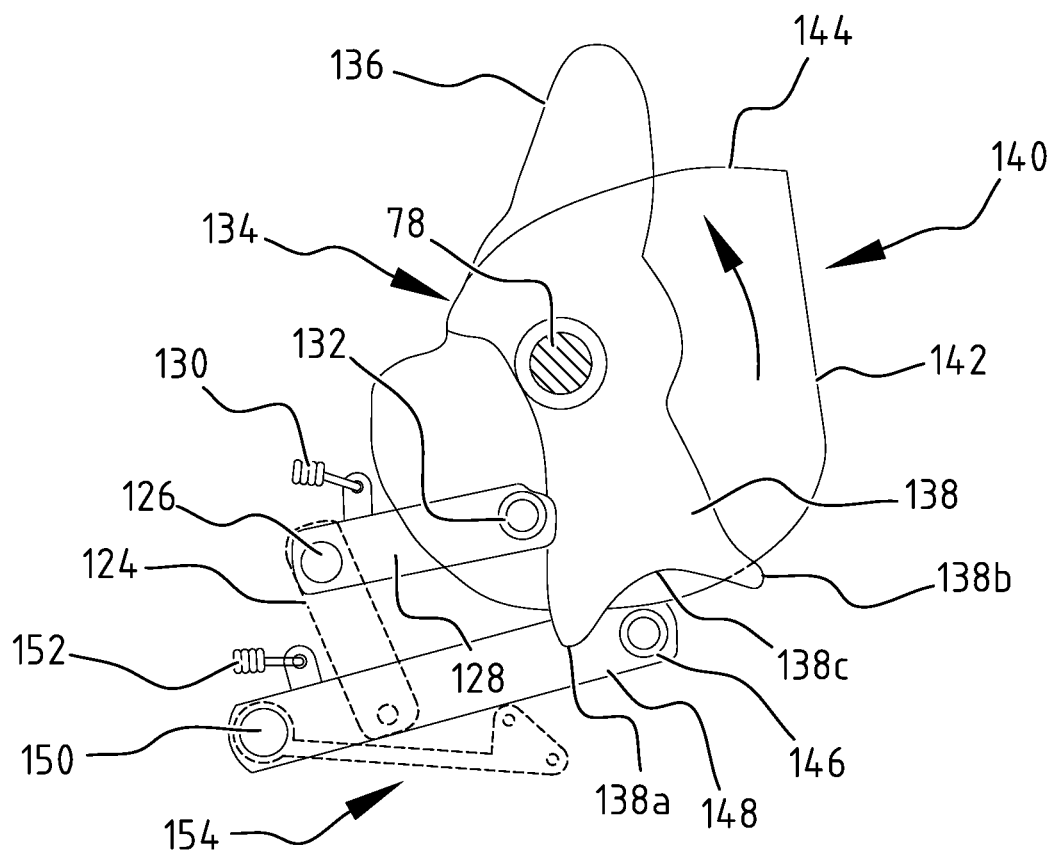
FIG. 14 is a fragmentary, elevational view of cams on a drive shaft of an exemplary embodiment of a knotter system, for operating a slack take-up device and a twine finger.

A twine finger 118 is located below the billhook 82 and the cutting arm 88 of the knotter 40 and is mounted on an upright pivot 120 for lateral swinging movement between a standby position illustrated in FIG. 4 and a laterally extended position as illustrated in FIG. 8. An operating link 122 attached at one end to the twine finger 118 and at the opposite end to a crank 124 serves to effect swinging of the twine finger 118. The crank 124 is in turn fixed to a transversely extending shaft 126 that extends to a point behind the knotter disc 76 where it may carry a second crank 128 as illustrated in FIG. 14. The crank 128 is biased upwardly in a counter-clockwise direction by a coil spring 130 and carries a cam follower 132 at its outermost end. The follower 132 is in position for operating engagement with a multiple-lobed cam 134 fixed to the shaft 78 for rotation therewith, its lobes 136 and 138 being circumferentially spaced apart in accordance with the desired timed relationship between the twine finger 118 and the knot-forming components of the knotter 40, as will be further explained below. The first lobe 136 is for performing a first swinging movement during the first knot forming cycle of a knotter cycle, and the second lobe 138 is for performing a second swinging movement during the second knot forming cycle of a knotter cycle. It is noted that the second lobe 138 is formed with two peaks 138a and 138b and a valley 138c between the two peaks 138a, 138b such that the twine finger 118 is moved first to a first extended position corresponding with peak 138a, then to a second position (corresponding with valley 138c) which is slightly retracted with respect to the first extended position, and next to a second extended position corresponding with peak 138b, and back to a standby position or rest position. Desirably, the twine finger 118 is moved back to the rest position directly after reaching the second extended position corresponding with peak 138b such that the twine finger 118 is back in the rest position before the cutting arm 88 comes in to engage the strands.

Also mounted on the shaft 78 with the cam 134 is a second cam 140 having a peripheral land stretch 142 and a peripheral valley stretch 144 divided over the circumference of the second cam 140. Such stretches 142 and 144 are disposed for operating engagement with a cam roller 146 located at the outer end of a lever 148 that is fixed at its inner end to a transverse shaft 150. The lever 148, and hence the shaft 150, are biased in a counter-clockwise direction viewing FIG. 14 by a coil spring 152. The shaft 150 extends back out to the opposite side of the knotter disc 76 parallel with the shafts 78 and 126 to a point substantially in fore-and-aft alignment with the billhook 82. At that location, the shaft 150 fixedly carries a rearward extending device 154, also called a tucker arm 154 of a slack take-up device. The tucker arm 154 may carry a pair of spaced rollers 156 and 158 at its rearmost end around which the strand 64a of tucker twine is entrained as illustrated in FIG. 4. A length of the strand 64a is also looped upwardly around another roller 160 disposed above the device 154. The strand 64a may be clamped between a pair of opposed plates 162 and 164 (FIG. 4) of a tensioning unit 166. The force with which the plates 162 and 164 clamp the strand 64a may be controlled by a wing nut 168 operating against a spring 170 that in turn presses against the movable plate 164. A tensioning unit similar to unit 166 may also be provided for the strand 66a of needle twine, although such additional unit is not illustrated.

Figure 5:
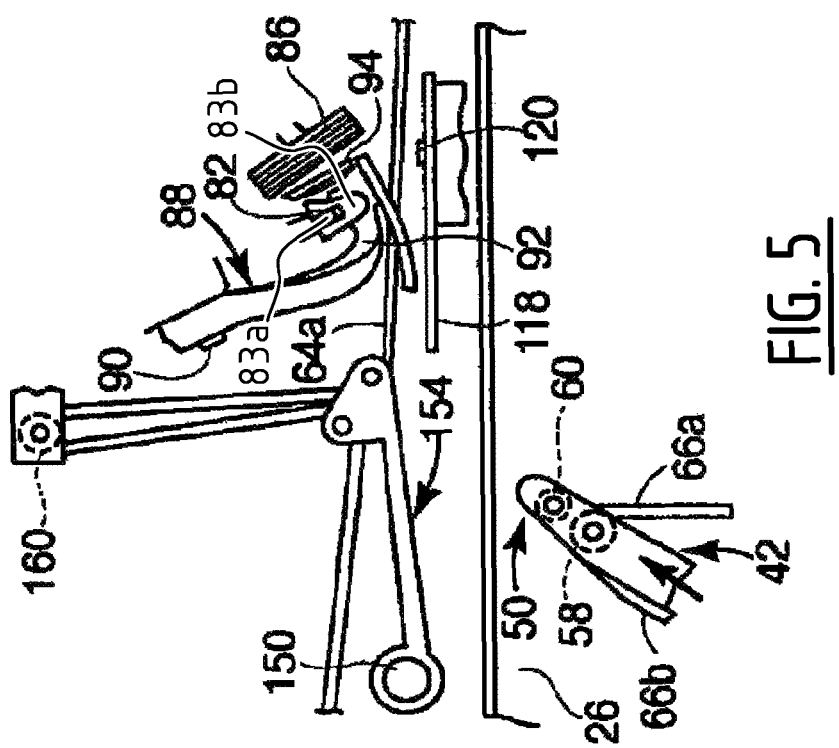

The condition of the partial loop 62a in FIG. 2, and that of the knotter 40 and the needle 42, corresponds substantially with conditions illustrated in FIGS. 4 and 5, with the exception that in FIG. 2, the needle 42 is still in its home position. At this point in the bale forming operation, the bale has reached its desired length and it is time to complete the loop around the bale and make the top left knot in the loop 62a. It is remarked that at this specific instance, the strand 64a of tucker twine stretches along the top of the bale directly beneath the cutting arm 88 but, at least for all effective purposes, is out of contact with the knotter 40. As illustrated in FIG. 8, as the needle 42 swings upwardly toward the knotter 40, it carries with it the strand 66a of needle twine as the latter is paid out by source 74. Note that because the strand 66a is threaded through the eyelet 52 of needle 42, a length of that strand on the twine source side of the needle 42 is also carried upwardly toward the knotter 40, such extra length being hereinafter denoted 66b. While the needle 42 approaches the knotter 40, no additional length of the strand 64a of tucker twine is pulled from the source 72. Even as the tip of the needle 42, and more particularly, the roller 60, snares the strand 64a as illustrated in FIG. 6 and presents strands 64a and 66a in unison to the knotter 40, still no additional length of the strand 64a is pulled from source 72 because the device 154 rocks upwardly in a counter-clockwise direction to provide the slack necessary in the strand 64a to accommodate the needle movement.

Figure 6:
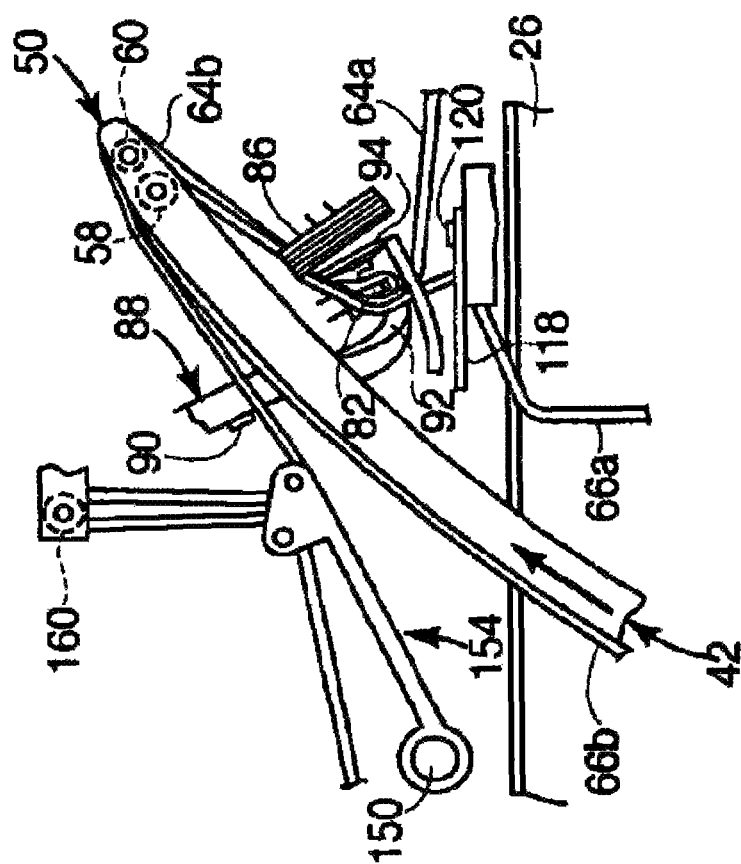
Figure 7:
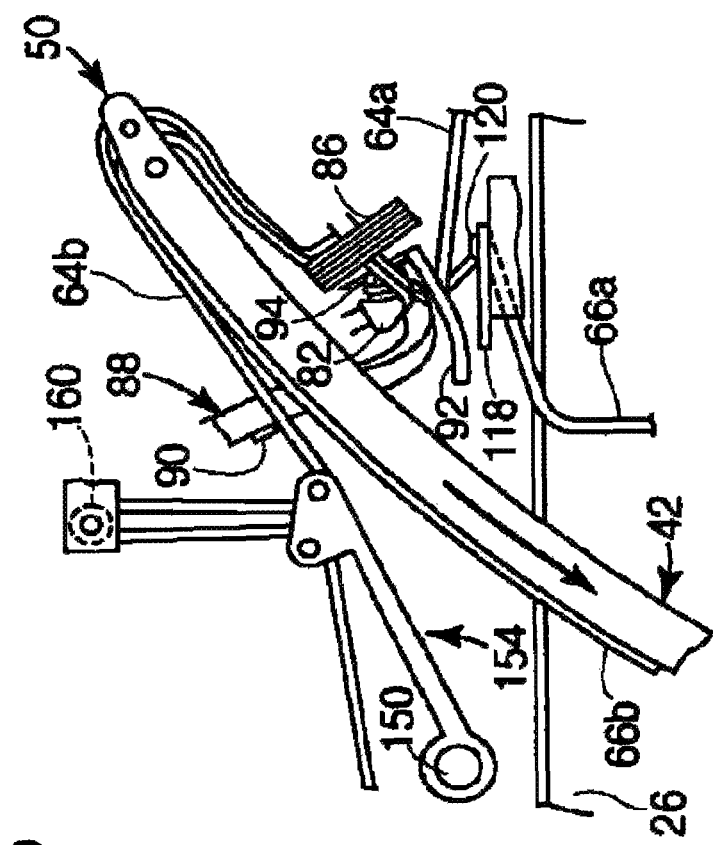

While the strands 64a and 66a are being delivered across the billhook 82 to the twine disc 86, the twine finger 118 is actuated to swing inwardly and engage at least the strand 66a of needle twine as illustrated in FIGS. 6 and 7 so as to assure that the strands 64a and 66a are both in proper position across the billhook 82. The twine finger 118 holds the strand 66a on the billhook 82 during the entire first knot forming cycle of a knotter cycle.

In presenting the strands 64a and 66a, the needle 42 actually drapes the strands 64a, 66a across the billhook 82 and thence into awaiting notches of the twine disc 86, whereupon rotation of co-operating discs in the latter, in combination with a pressing twine holder serves to firmly grip the strands and prevent their escape as the billhook 82 begins its rotation as illustrated in FIG. 7. The needle 42 reaches its highest position and starts to go down, see FIG. 8. The twine disc 86 rotates a quarter of a turn and clamps the twines 64b and 66b firmly together. During the down travel of the needle 42 the two twines on the back of the needle 42 are placed in the next notch of the twine disc 86 for the second knot (FIG. 9). While the needle 42 goes down, the billhook 82 rotates to form the first knot 70a. The cutting arm 88 swings out to cut the twines under the twine disc and sweeps the first knot 70a from the billhook.

When the needle 42 delivers the strands 64b and 66b to the twine disc 86, the twine disc 86 rotates in such a manner that the strands 64b and 66b are retained twice in different notches in the twine disc 86. By doing so, two knots 70a and 68b can be formed during one knotter cycle as will be explained further, whereby the knife 94 severs the strands 64a and 66a from the strands 64b and 66b after the first knot 70 is formed and the removal part 92 of the cutting arm 88 removes the first knot 70a from the billhook 82, thus separating the two loops from each other. The adjustable leaf-spring 200 pushes against the twine holder, thus cooperating with the twine disc 86 to retain the strands.

The foregoing described movements on the part of the billhook 82 and the twine disc 86 are brought about by operable inter-engagement of the gear stretch 98 and gear section 106 on the knotter disc 76 with their respective gears 96 and 104 on the billhook 82 and the twine disc 86. Such driving inter-engagement continues until a first knot 70a has been formed on the billhook 82 as illustrated in FIGS. 8 and 9, by which time the needle 42 has begun to withdraw. At this point, the cam shoulder 114 of the knotter disc 76 comes into engagement with the roller 110 of the cutting arm 88 so as to swing the bottom of the latter, and hence the knife 94, across that portion of the strands between the billhook 82 and the twine disc 86, thereby severing the same as illustrated in FIG. 9 and previously explained. At the moment of cutting, the strands 64a and 66a extend from in between the lips 83a and 83b towards the twine disc 86. Considering that the knife 94 moves closely alongside the billhook 82, the free ends of the cut strands 64a and 66a extend only over a very short distance out of the upper lip 83a and lower lip 83b. To complete the first knot forming cycle, the removal part 92 of cutting arm 88 engages the strands 64a and 66a which are retained around the billhook 82. In so doing, the strand parts lying on top of the lip 83a are pulled over the strand parts laying in between the lips 83a and 83b, thereby forming the first knot 70a. As described above, since the free ends of the strands 64a and 66a are very short, they are pulled completely through the first knot during its final formation, resulting in the so-called conventional knot 70a, as best seen in FIG. 10. Besides completing the first knot, further motion of the cutting arm 88 also strips the finished knot 70a completely from the billhook 82 and drops the completed loop 62a on the bale as illustrated in FIG. 10.

Figure 11:
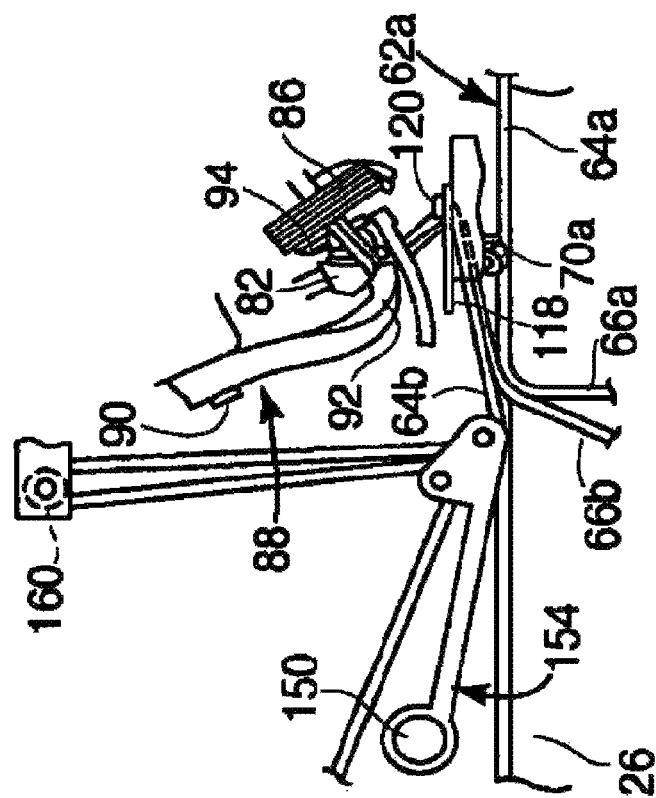
Figure 12:
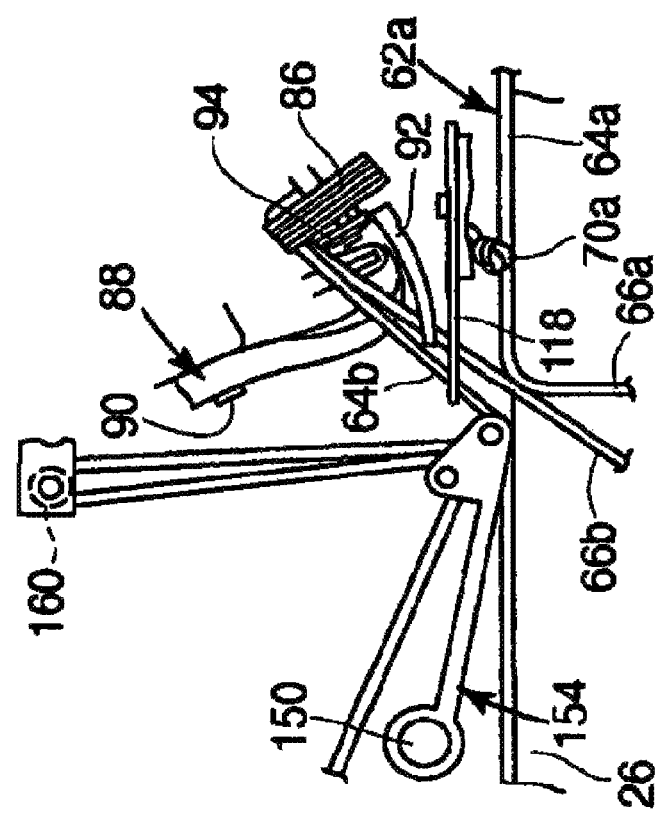

When the first knot 70a is dropped by the knotter 40 following severance and stripping from the billhook 82, the strand 66b of needle twine from source 74, as well as strand 64b of tucker twine from source 72 is still retained in the second notch and possibly also in the first notch of the twine disc 86. At this instance, the upper lip 83a is open again. Consequently, as the needle 42 continues to retract, the strand 66b is draped downwardly across the bale chamber 26 thereby pushing the upper lip 83a down because of the pressure of the strands on the upper lip 83a, while the tucker arm 154 lowers to its normal position to pull a small amount of additional twine from the source 72. Upon reaching the condition illustrated in FIG. 11, the strands 64b and 66b are in position for initiating the second knot forming cycle which is started by the twine finger 118 (which has been previously returned to its standby position, after completion of the first knot) swinging inwardly to engage the strands 64b and 66b and to assure that the strands 64b and 66b are properly positioned across and in engagement with the billhook 82, see FIG. 12, whereupon the latter and the twine disc 86 are operated by their second respective gear stretch 100 and gear section 108 on the knotter disc 76 to form the second knot 68b on the billhook 82.

Figure 13:
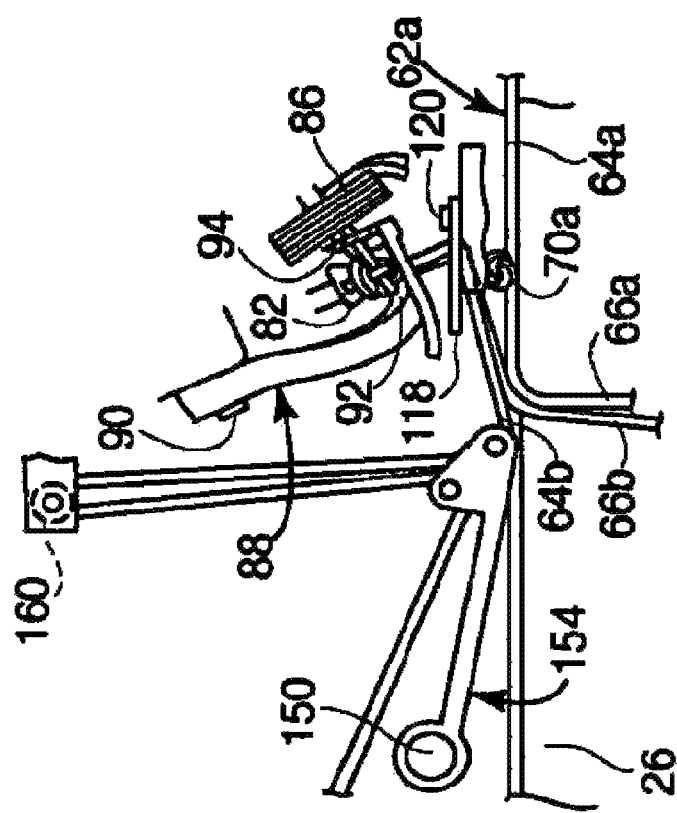
Figure 20:
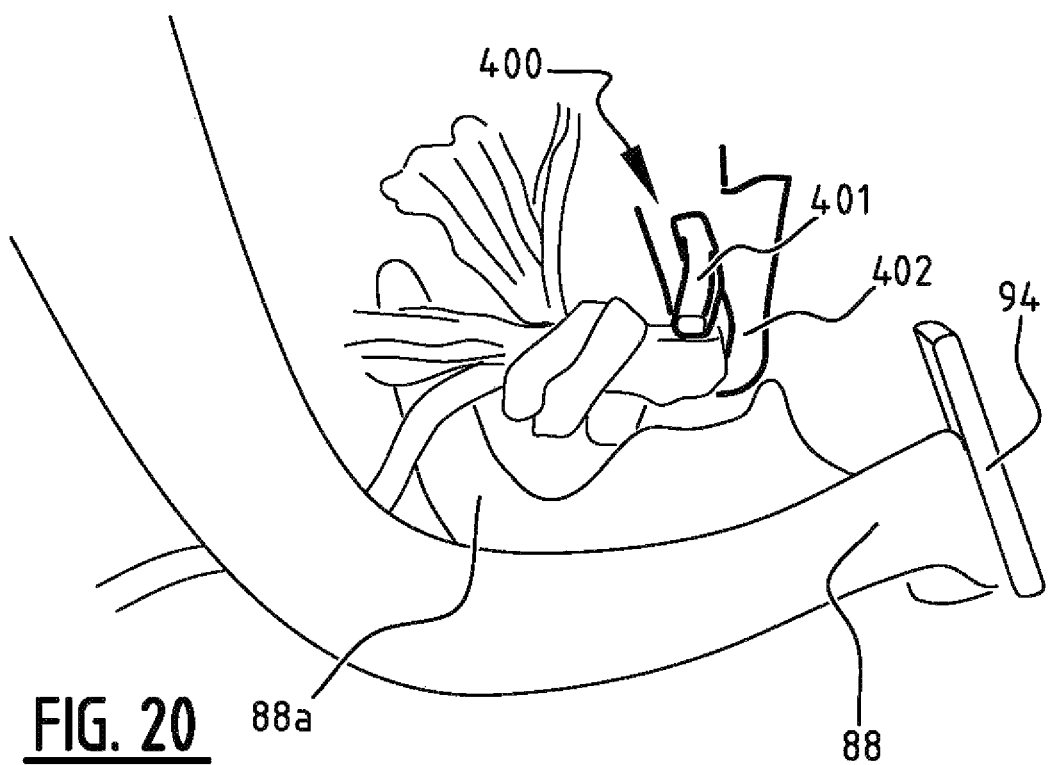
FIG. 20 illustrates a loopknot formed on a billhook while the twines leading up to the billhook are supported by a cutting arm tail according to an exemplary embodiment of a knotter system.

The second knot 68b becomes formed as illustrated in FIG. 13, whereupon the cutting arm 88 is once again actuated, but this time by the second cam shoulder 116. When the tension of leaf-spring 200 is set to a low value, the pressure of the retainer 220 on the twine disc 86 and hence the force that holds the strands fixed within the twine disc 86, will be minimal. Additionally, the supplementary gear section 109 provides a prolonged operation of the twine disc 86 and will keep the twine disc 86 rotating over a longer arc. The strands 64b and 66b are no longer retained between the notch in the twine disc 86 and the retainer 220. Therefore, when the arm 88 starts its movement for finalizing the knot formation, the cutter or knife 94 will not be able to effect any cutting action. Indeed, even though the cutter 94 is very sharp, it will act as a blunt knife and will not be able to cut the strands because instead of holding the strands, the twine disc 86 is releasing them on account of the continued rotation of the twine disc 86 and the low pressure of the retainer 220 on the twine disc 86. The strands will therefore just slide over the knife 94 without being cut, while the arm 88 continues moving and pulling the strands out of the twine disc 86. This results in the free ends of the strands 64b and 66b being considerably longer than the free ends obtained during the first knot formation. As such, upon finalizing the knot, free ends 64b and 66b no longer are pulled completely out of the knot, resulting in a so-called loopknot being retained on and in between the lower lip 302 and upper lip 301 of the closed billhook 82, as can be seen in FIG. 20. Since the loopknot is retained by the closed billhook 82, the movement of the cutting arm 88 does not suffice to completely remove the loopknot from the billhook. However, by specifically configuring and arranging the billhook 82, cutting arm 88 and/or twine finger 118, the movement of a bale which is being formed may be used to exert a pulling force on the twines to remove the formed second knot, the loopknot, from the billhook 82.

Figure 15:
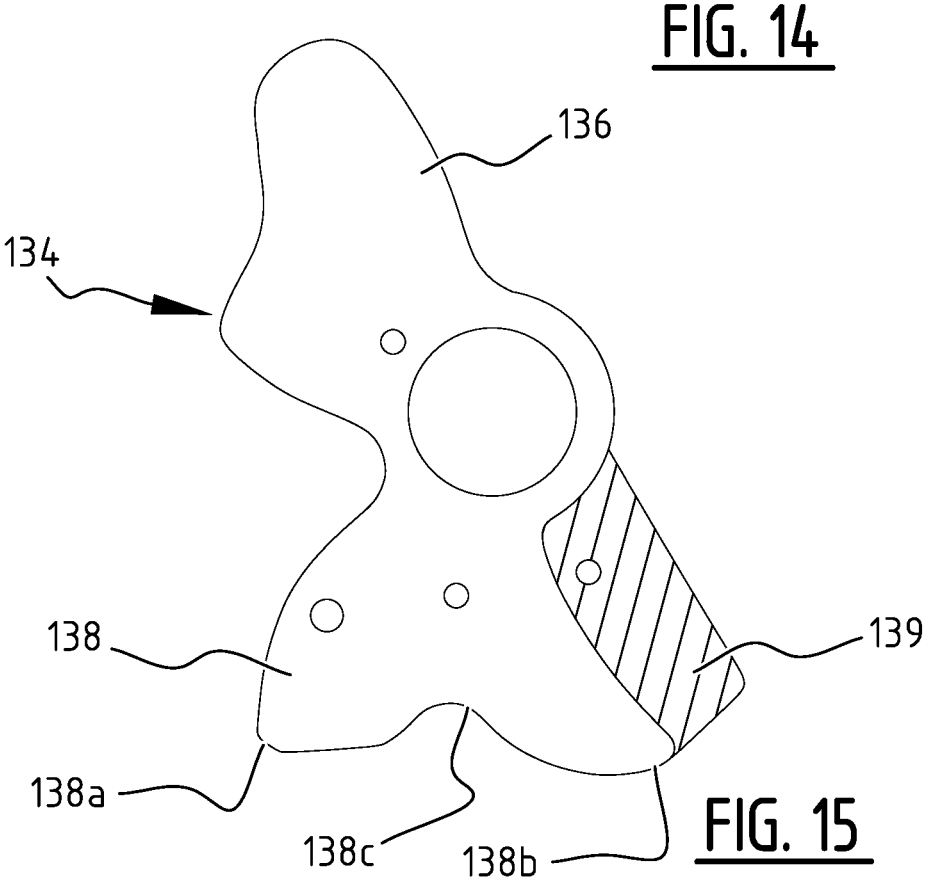
FIG. 15 is a fragmentary, elevational view of a cam according to an exemplary embodiment of a knotter system.

As earlier described with reference to FIG. 14, the movement and timing of the twine finger 118 is determined by the shape of a multiple-lobed cam 134 with lobes 136 and 138 being circumferentially spaced apart in accordance with the desired timed relationship between the twine finger 118 and the knot-forming components of the knotter 40, especially the billhook 82 and the cutting arm 88. FIG. 15 illustrates an alternative embodiment of such a multiple-lobed cam 134 according to the invention. The first lobe 136 is for performing a first swinging movement during the first knot forming cycle of a knotter cycle, and the second lobe 138 is for performing a second swinging movement during the second knot forming cycle of a knotter cycle. Since the loopknot is formed during or at the end of the second knot forming cycle, the shape of the second lobe 138 is of particular relevance for removing the loopknot from the billhook 82. The second lobe 138 is formed with two peaks 138a and 138b and a valley 138c between the two peaks 138a, 138b such that the twine finger 118 is moved first to a first extended position corresponding with peak 138a, then to a second position, corresponding with valley 138c, which is slightly retracted with respect to the first extended position, next to a second extended position corresponding with peak 138b, and back to a standby position or rest position. Desirably, the twine finger 118 is moved back to the rest position directly after reaching the second extended position corresponding with peak 138b such that the twine finger 118 is back in the rest position before the cutting arm 88 comes in to engage the strands. To this end, the second peak 138b is sharpened and/or shortened as compared to prior art cams by cutting out the marked portion 139. In other words, although the twine finger 118 is still able to reach its extended position, at the top of second peak 138, the twine finger 118 will directly move back to its rest position after reaching its extended position. In this manner, the twines are no longer being held below and across the billhook 82 as for example illustrated in FIG. 8, but the twines are released from the grasp of the twine finger 118 as illustrated in FIG. 9. In this manner, the twines are properly positioned to be supported by the cutting arm 88 which is actuated when the loopknot is formed on the billhook 82.

Figure 19B:
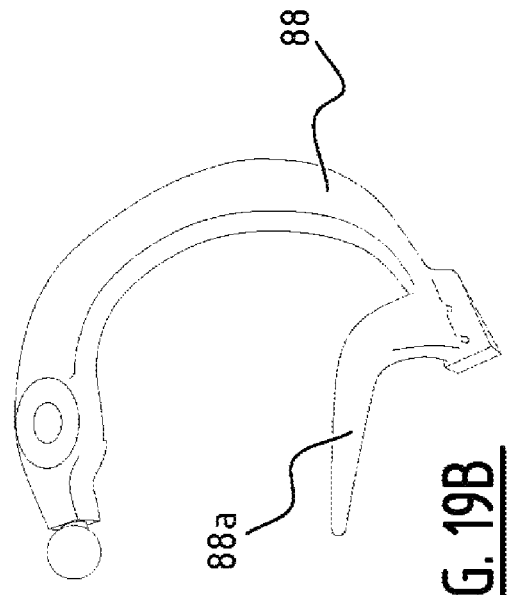
FIGS. 19A and 19B illustrate a prior art cutting arm and a cutting arm according to an exemplary embodiment of a knotter system, respectively.
Figure 19A:
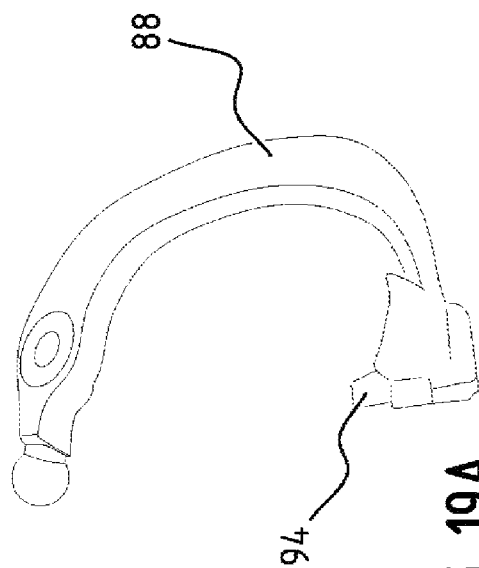
Figure 21:
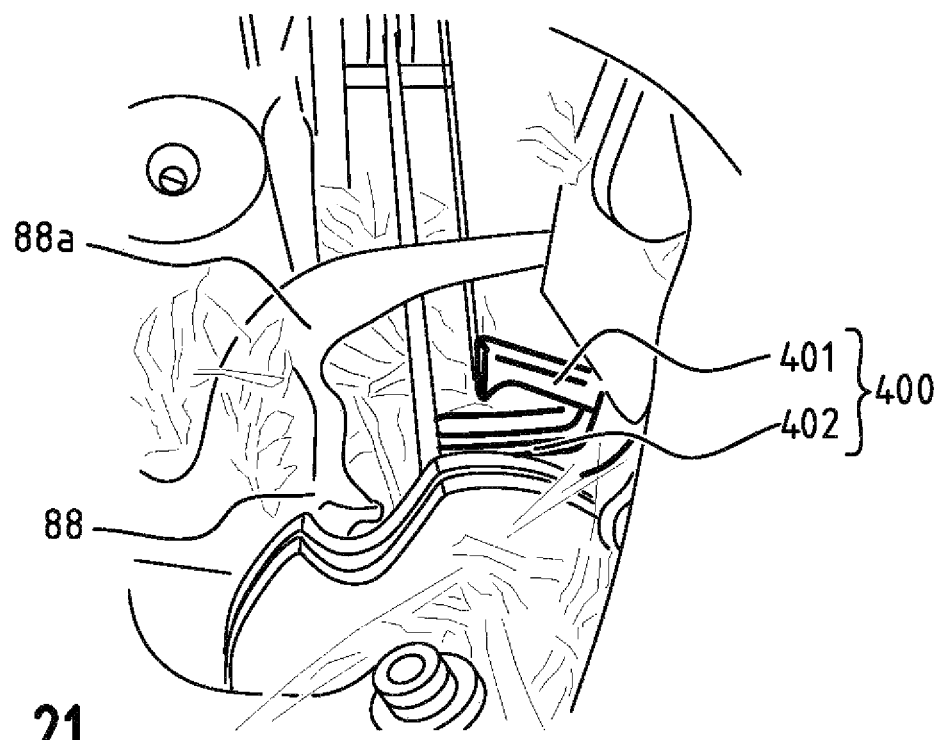
FIG. 21 illustrates the cutting arm tail after the loopknot from FIG. 20 has been pulled from the billhook.

In order to properly support the twines which are released from the grasp of the twine finger 118, the cutting arm 88 comprises twine supporting means 88a which are configured to support the needle twine and tucker twine leading up to the formed loopknot, and which are illustrated in FIGS. 20 and 21. In FIG. 20 the loopknot has formed on the billhook 400 according to the invention and the twines are resting on the twine supporting means 88a of the cutting arm 88. Such position and orientation of the twines leading up to the billhook 400 allow for the movement of a bale which is being formed to exert a pulling force on the twines and on the loopknot on the billhook 400. FIG. 21 illustrates the cutting arm 88 with twine supporting means 88a and the billhook 400 after the loopknot has been pulled from the billhook 400. As illustrated the twine supporting means 88a are formed as an elongated protrusion or tail extending from the cutting arm 88. This is further illustrated by FIGS. 19A and 19B wherein FIG. 19A illustrates a prior art cutting arm 88 with a knife 94, but without twine supporting means, and wherein FIG. 19B illustrates a cutting arm 88 with twine supporting means 88a according to an embodiment of the invention.

In addition to bringing the twines leading up to the billhook 400 in a proper position for exerting a pulling force by means of bale movement, the billhook can be further adapted such that the exerted pulling force will open the billhook 400. In an embodiment, the billhook 400 is configured to have a draft angle or opening angle in the direction facing away from the twine disc 86 such that the exerted pulling force opens the billhook 400. The opening angle is thus aimed towards the front of the baler when the knotter system is implemented in a baler. In this manner, when the twines are properly positioned, the pulling force exerted by the movement of a bale being formed, will cause the upper lip 401 of the billhook 400 to pivot away from the lower lip 402 of the billhook 400. This is for example illustrated in FIG. 21 wherein the billhook 400 is in an open position wherein the upper lip 401 is not in engagement with the lower lip 402, after the loopknot has been pulled from the billhook 400.

Figure 16A:
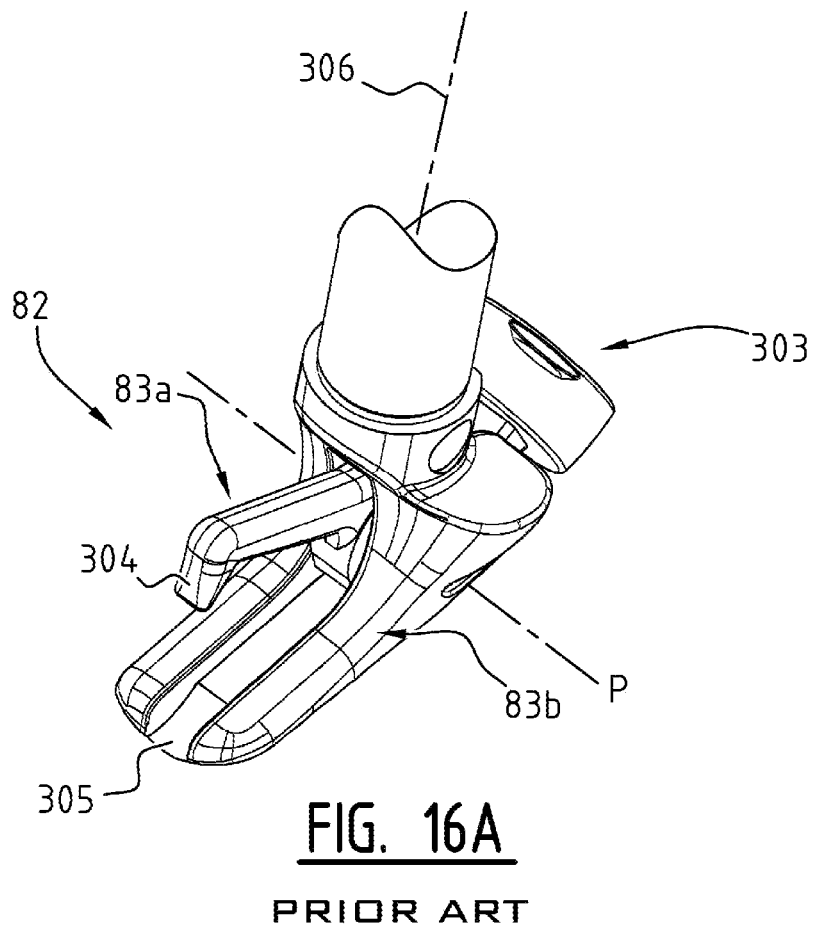
FIGS. 16A and 16B illustrate a prior art billhook.
Figure 16B:
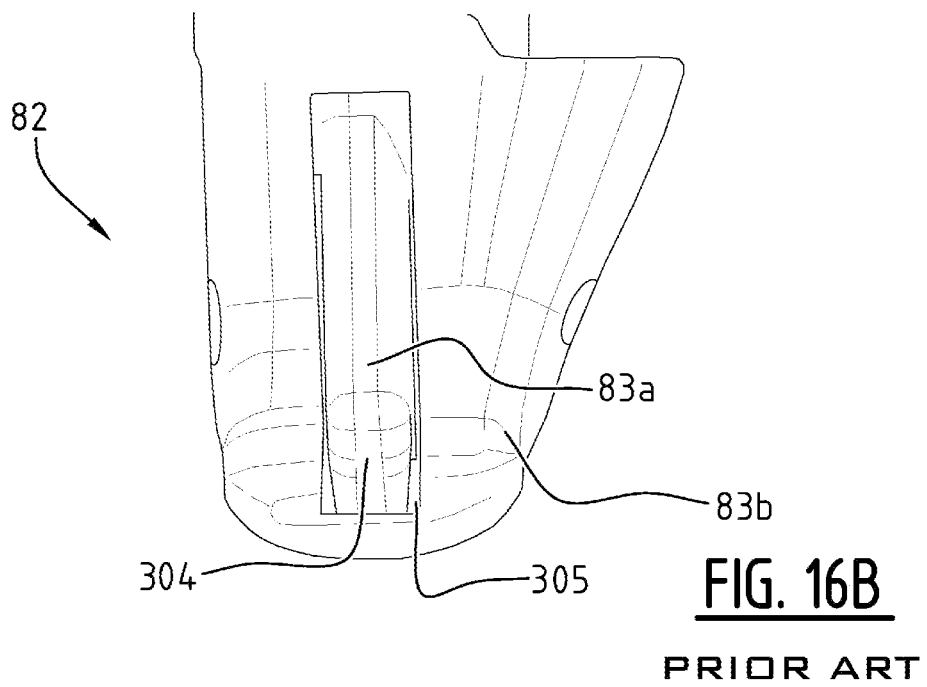

FIGS. 16A and 16B illustrate a prior art billhook 82 in more detail. The billhook 82 comprises a lower lip 83b and an upper lip 83a mounted pivotally around pivot axis P with respect to lower lip 83b. When the billhook 82 rotates around its axis 306, a cam follower 303, which is connected to the upper lip 83a, engages an element having a cam shoulder. When rotating, the cam follower will push the upper lip 83a away from the lower lip 83b, thus enabling the strands 64a and 66a to enter in between the two lips 83a and 83b while the billhook is rotated. The upper lip 83a is provided at a freed end thereof with a downwardly protruding end part 304, and the lower lip 83b is provided with and end recess 305 for receiving the protruding end part.

Figure 17A:
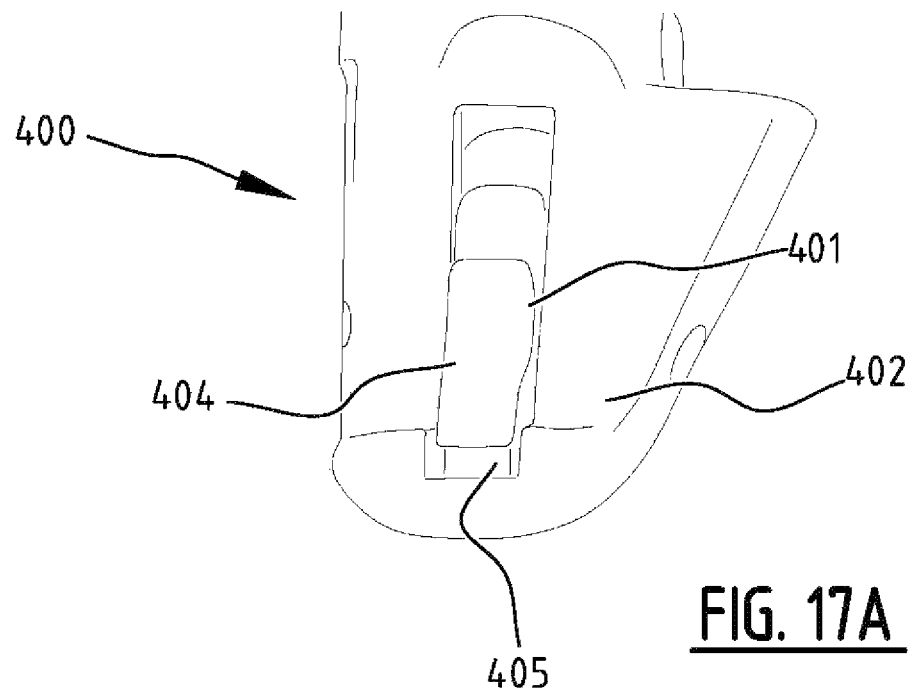
FIGS. 17A and 17B illustrate a billhook according to exemplary embodiments of a knotter system.
Figure 17B:
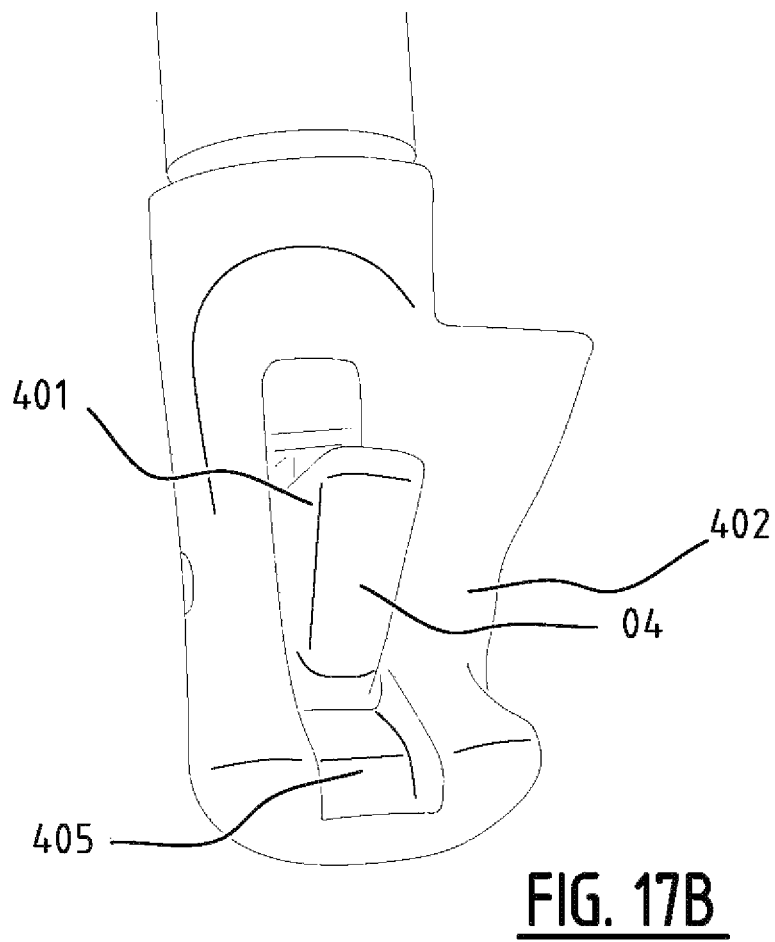

FIGS. 17A and 17B illustrate a billhook 400 according to an embodiment of the invention. According to the illustrated embodiment the upper lip 401 of the billhook 400 is torqued or twisted to create an opening angle. The pivot axis P is the same as illustrated in FIGS. 16A and 16B. By deforming the upper lip 401 in such a manner, it is achieved that the pulling force on the twines, when the twines are positioned as described earlier and as illustrated in FIG. 20, will result in an upward force against the upper lip 401 of the billhook 400. This upward force will cause the billhook 400 to open, allowing the loopknot to be pulled of from the billhook 400 by the pulling force exerted by the bale being formed. In other words, by configuring and arranging the billhook 400, cutting arm 88 and/or twine finger 118 as described above, the formed second knot can be passively pulled from the billhook by means of bale movement.

Figure 18B:
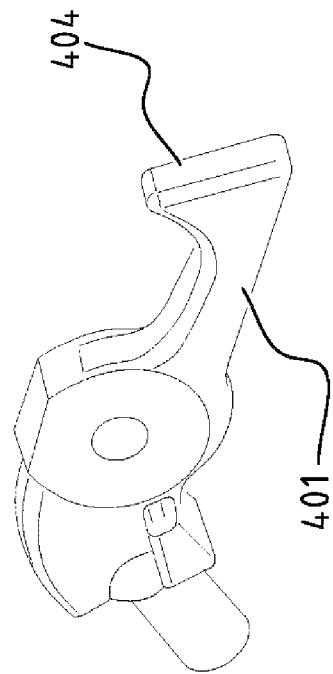
FIG. 18A illustrates a prior art billhook upper lip and FIG. 18B illustrates an upper lip of a billhook according to an exemplary embodiment of a knotter system of the present invention, respectively.
Figure 18A:
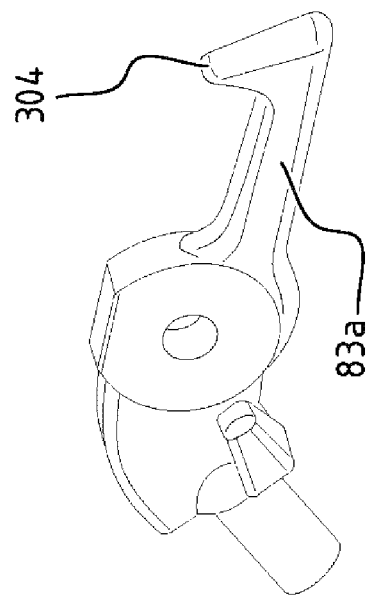

FIGS. 18A and 18B further illustrate the difference between an upper lip 83a of a prior art billhoo100, and the upper lip 401 of a billhook 400 according to an embodiment of the invention. In FIG. 18B the upper lip 401 has been deformed such that, when pivotally combined with a billhook lower lip in a knotter system, the billhook would define a draft angle which faces away from the twine disc 86 (not shown). Alternatively, or in addition to deforming the upper lip 401, the pivot axis P as illustrated in FIGS. 16A and 16B may be slightly inclined in order to create the draft angle of the billhook 400.

For the sake of completeness it is mentioned that the second knot is the start of a new bight for the next bale. Such bight is in position to receive new material that is packed into the bale chamber 26 by the plunger 30, and the bight grows in length as additional lengths of the strands 64b and 66b are simultaneously pulled from their sources 72 and 74. Finally, when a certain amount of new material is present in the bale chamber 26 the incomplete bale which is being formed will slide further backwards into the bale chamber 26 and generate a pulling force which pulls the formed second knot from the billhook. Then the sequence returns to its starting point, whereupon the bight is closed by operation of the needle 42 to complete the loop around the bale and form the other knot.

While the principles of the invention have been set out above in connection with specific embodiments, it is to be understood that this description is merely made by way of example and not as a limitation of the scope of protection, which is determined by the appended claims.

The invention claimed is:

1. A knotter system for a baler for performing a knotter cycle comprising a first knot forming cycle and a second knot forming cycle, the knotter system comprising:
   a needle configured for delivering a needle twine;
   a tucker arm configured for delivering a tucker twine;
   a twine receiver configured for holding the needle twine and the tucker twine;
   a billhook assembly comprising a billhook with a lower lip and an upper lip mounted pivotally with respect to the lower lip along a pivotal axis, the billhook being mounted rotatably around a rotation axis and being arranged for receiving the needle twine and the tucker twine;
   a cutting arm configured for cutting twines;
   a twine finger configured for guiding at least the needle twine;
   a driver configured:
      to make the billhook perform at least a first full rotation around the rotation axis during the first knot forming cycle and a second full rotation around the rotation axis during the second knot forming cycle;
      to move the cutting arm a first time from a rest position to an extended position and back during the first knot forming cycle and a second time during the second knot forming cycle; and
      to move the twine finger at least a first time during the first knot forming cycle and a second time during the second knot forming cycle,
   wherein the billhook, cutting arm, and twine finger are configured such that, at an end of the second knot forming cycle, a bale movement of a bale which is being formed by the baler exerts a pulling force on the twines which removes the twines from the billhook,
   wherein the cutting arm is configured for sweeping a formed knot from the billhook during the first knot forming cycle and only partly during the second knot forming cycle, respectively.

2. The knotter system according to claim 1, wherein the billhook, cutting arm, and twine finger are configured such that the twines are positioned in such a way that the pulling force causes the billhook to open.

3. The knotter system according to claim 1, wherein the billhook is configured such that the pulling force on the twines causes the upper lip of the billhook to pivot away from the lower lip of the billhook.

4. The knotter system according to claim 1, wherein the upper lip of the billhook is formed such that the upper lip and the lower lip define an opening angle in a direction of the pulling force.

5. The knotter system according to claim 1, wherein the upper lip is mounted pivotally with respect to the lower lip along a pivotal axis which is inclined with respect to the lower lip.

6. The knotter system according to claim 1, wherein the cutting arm comprises a twine supporter which is configured to, at least at the end of the second knot forming cycle, support the needle twine and tucker twine leading up to the formed knot in such a position that the pulling force removes the formed knot from the billhook.

7. The knotter system according to claim 6, wherein the twine supporter comprises an elongated protrusion extending from the cutting arm.

8. The knotter system according to claim 1, wherein the driver is configured to move the twine finger, during the second knot forming cycle, from a rest position to a fully extended position, then to a less extended position while rotating the billhook, and back to the rest position.

9. The knotter system according to claim 1, wherein the driver comprises an operating link, a crank, and a transversely extending shaft, the operating link being attached at one end to the twine finger and at an opposite end to the crank for driving a swinging movement of the twine finger, the crank being fixed to the transversely extending shaft configured to be rotated such that the twine finger performs the swinging movement.

10. The knotter system according to claim 9, wherein the transversely extending shaft carries a second crank which carries a cam follower at its outermost end, the cam follower being in position for operating engagement with a cam fixed to a driving shaft for rotation therewith, the cam having at least a first lobe and a second lobe for swinging the twine finger during the first and the second knot forming cycles, respectively.

11. The knotter system according to claim 10, wherein the second lobe is formed with two peaks and a valley between the two peaks for causing the twine finger, during the second knot forming cycle, to swing from a rest position to a fully extended first position, then to a less extended second position, next to a fully extended third position, and back to the rest position.

12. The knotter system according to claim 1, wherein the driver comprises a pinion and at least a first gear stretch and a second gear stretch provided along a circumference of a disc, the pinion being configured to cooperate with the first and second gear stretches for making the billhook perform a first full rotation and a second full rotation respectively when the disc is rotated for forming the first and the second knots, respectively.

13. The knotter system according to claim 12, wherein the driver comprises a cam track and a cam follower, the cam follower being connected with the cutting arm, and the cam track being provided in the disc or in a member mounted for rotating synchronously with the disc, and being configured for moving the cutting arm a first time and a second time during the first and the second knot forming cycles, respectively.

14. A baler comprising a plurality of knotter systems according to claim 1.

* * * * *